United States Patent [19]

Fukuda et al.

[11] Patent Number: 4,909,913

[45] Date of Patent: Mar. 20, 1990

[54] METHOD FOR RECOVERING A METAL

[75] Inventors: Kenichi Fukuda; Takashi Mori; Yasuhiro Kurauchi, all of Shin-nanyo; Tetsuya Suematsu, Tokuyama, all of Japan

[73] Assignee: Toyo Soda Manufacturing Co., Ltd., Shin-nanyo, Japan

[21] Appl. No.: 235,796

[22] Filed: Aug. 23, 1988

Related U.S. Application Data

[63] Continuation of Ser. No. 39,685, Apr. 20, 1987, abandoned.

[30] Foreign Application Priority Data

Jun. 10, 1986 [JP] Japan .................................. 61-132824
Jun. 13, 1986 [JP] Japan .................................. 61-135889

[51] Int. Cl.$^4$ .............................................. C25C 7/04
[52] U.S. Cl. ................................ 204/105 R; 204/109; 204/110; 204/296; 521/25; 521/27
[58] Field of Search .......................... 204/105 R, 296

[56] References Cited

U.S. PATENT DOCUMENTS

| | | | |
|---|---|---|---|
| 4,322,501 | 3/1982 | Lee et al. ............................ | 521/27 |
| 4,586,992 | 5/1986 | Miyake et al. ...................... | 204/296 |
| 4,604,170 | 8/1986 | Miyake et al. ...................... | 204/296 |
| 4,637,865 | 1/1987 | Sergent et al. ..................... | 204/111 |
| 4,659,744 | 4/1987 | Matsui et al. ....................... | 521/32 |
| 4,661,231 | 4/1987 | Matsui et al. ....................... | 204/296 |

FOREIGN PATENT DOCUMENTS 0140544 5/1985 European Pat. Off.
135695 9/1984 United Kingdom.

OTHER PUBLICATIONS

Chemical Abstracts, vol. 89, No. 14, Oct. 2, 1978, Abstract No. 111198c.

Primary Examiner—John F. Niebling
Assistant Examiner—Kathryn Gorgos
Attorney, Agent, or Firm—Oblon, Spivak, McClelland, Maier & Neustadt

[57] ABSTRACT

A method for producing a metal salt by electrolysis in an electrolytic cell comprising an anode compartment and a cathode compartment partitioned by a diaphragm, characterized by supplying to the cathode compartment an aqueous solution of a water-soluble metal compound, and electrolytically reducing metal ions or metal complex ions to electroplate the metal on a cathode, wherein the diaphragm is a fluorinated anion exchange membrane made of a copolymer having repeating units of the formula:

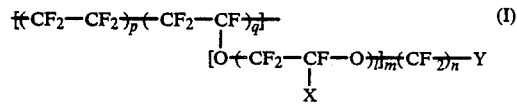

wherein X is F or $CF_3$, l is an integer of from 0 to 5, m is 0, or 1, n is an integer of 1 to 5, each of p and q is a positive number and the ratio of p/q is from 2 to 16, and Y is a group involving a quaternary ammonium group.

12 Claims, 1 Drawing Sheet

METHOD FOR RECOVERING A METAL

This application is a Continuation of application Ser. No. 07/039,685, filed on Apr. 20, 1987, now abandoned.

The present invention relates to a method for recovering a metal from an aqueous waste solution containing a water-soluble metal compound by electroplating the metal on a cathode by an ion exchange membrane electrolysis wherein a special fluorinated anion exchange membrane is used as a diaphragm.

Waste solutions containing metals discharged from various metal plants, such as a waste solution from acid washing of iron, a nickel-containing waste solution from a refinery of copper or metal-containing waste solutions from various plating plants, are enormous both in the variety and the amounts. If such waste solutions are disposed untreated to rivers or to the sea, not only useful resources are wasted, but environmental problems will be created. Therefore, various efforts have been made in the related industries for the treatment of these waste solutions. In recent years, some of waste solutions from the plating of printed circuit boards at semiconductor plants, contain noble metals such as gold, and such noble metals must be recovered with a view to effectively utilizing important natural resources. Further, if waste solutions contain hazardous metals such radio active metals, mercury or cadmium, it is necessary to treat them completely within the installation sites. Accordingly, it has been strongly desired to develop a treatment system whereby metals are recovered from metal-containing waste solutions in a closed system within the plant, and the effective utilization of resources can be ensured.

In addition to an electrolytic recovery method, a chemical recovery method, an adsorption recovery method or a solvent extraction method may be mentioned as the method for the recovery of metals from aqueous waste solutions containing water soluble metal compounds. For instance, a reducing method by means of zinc powder may be mentioned as a typical example of the chemical recovery method. However, in this method, an aqueous zinc salt solution will remain, thus creating a zinc waste solution. In an adsorption recovery method wherein an ion exchange resin is used, the adsorption capacity depends largely on the pH value of the waste solution, whereby a substantial labour force and a considerable cost for the reagent will be required for the control of the pH. Further, there is a limit in the adsorption capacity, whereby it is necessary to change the ion exchange resin frequently, and the amount of the ion exchange resin required is substantial, thus leading to a disadvantage from the viewpoint of the cost. The solvent extraction method has a drawback such that the efficiency tends to be poor as the metal concentration is low. On the other hand, in the electrolytic recovering method, if the electrolysis is conducted without a diaphragm, both reduction and oxidation proceed in the same electrolytic cell, whereby the efficiency for the recovery of a metal tends to be poor. In order to overcome this drawback, it is necessary to use a diaphragm. However, with a conventional diaphragm (such as a porous nylon membrane), there are problems with respect to e.g. the heat resistance and the leakage of the metal, and there has been no satisfactory diaphragm electrolytic method. In many metal-related industrial fields, the recovery of metals from aqueous waste solutions is practically conducted in large scales, and it is desired to develop a method for recovering a metal in a closed system without producing another waste material. However, there are many restrictive conditions from the viewpoint of the process, or a number of problems to be solved.

Under the circumstances, it will be possible to efficiently recover a metal by electrolysis if an ion exchange membrane capable of adequately separating a metal is available.

Either a cation exchange membrane or an anion exchange membrane will be used for the recovery of a metal by means of this ion exchange membrane method. When a cation exchange membrane is used, hydrogen ions transfer from an anode compartment through the cation exchange membrane to the cathode compartment, whereby the acidity of the anolyte solution containing the dissolved metal decreases, and the current efficiency for dissolving the metal tends to decrease. Therefore, it is necessary to frequently supply an acid to the anolyte solution. On the other hand, in the case where an anion exchange membrane is used, there is a little possibility for such a problem.

Thus, it is evident that an anion exchange membrane is necessary for the recovery of a metal by means of an ion exchange membrane. However, the conventional anion exchange membranes have problems in the durability such as acid resistance, and is not practically useful for an industrial process.

It is an object of the present invention to provide a method for recovering a metal in a stabilized condition for a long period of time while preventing a loss of metal ions by their leakage to the counter electrode compartment, by means of a two compartment electrolytic cell wherein a fluorinated anion exchange membrane having excellent durability to the electrolytic solution used, is used as a diaphragm.

The present invention provides a method for recovering a metal by electrolysis in an electrolytic cell comprising an anode compartment and a cathode compartment partitioned by a diaphragm, characterized by supplying to the cathode compartment an aqueous solution of a water-soluble metal compound, and electrolytically reducing metal ions or metal complex ions to electroplate the metal on a cathode, wherein the diaphragm is a fluorinated anion exchange membrane made of a copolymer having repeating units of the formula:

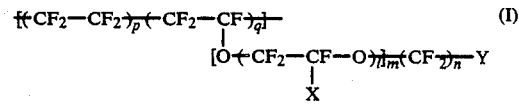

wherein X is F or $CF_3$, l is an integer of from 0 to 5, m is 0 or 1, n is an integer of 1 to 5, each of p and q is a positive number and the ratio of p/q is from 2 to 16, and Y is a group involving a quaternary ammonium group.

Now, the present invention will be described in detail with reference to the preferred embodiments.

Figure 1:
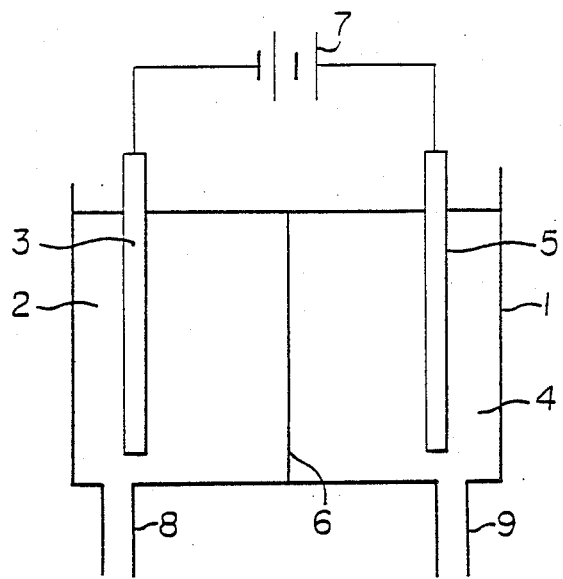
FIG. 1 is a schematic view illustrating an embodiment of the electrolytic process of the present invention.

The fluorinated anion exchange membrane used as the diaphragm in the present invention is made of a copolymer having repeating units of the formula I. The fluorinated anion exchange membrane to be employed in the present invention, preferably has, as the group involving a quaternary ammonium group, a group of the formula:

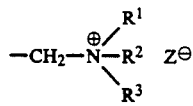

wherein each of $R^1$, $R^2$ and $R^3$ is a lower alkyl group, provided that $R^1$ and $R^2$ may together form a tetramethylene group or a pentamethylene group, and $Z^\ominus$ is a halogen anion; a group of the formula:

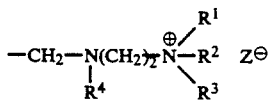

wherein each of $R^1$, $R^2$ and $R^3$ is a lower alkyl group, provided $R^1$ and $R^2$ may together form a tetramethylene group or a pentamethylene group, $R^4$ is a hydrogen atom or a lower alkyl group, and $Z^\ominus$ is a halogen anion; a group of the formula:

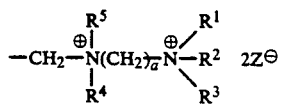

wherein each of $R^1$, $R^2$ and $R^3$ is a lower alkyl group, provided $R^1$ and $R^2$ may together form a tetramethylene group or a pentamethylene group, each of $R^4$ and $R^5$ is a hydrogen atom or a lower alkyl group $Z^\ominus$ is a halogen anion, and a is an integer of from 3 to 7; or a group of the formula:

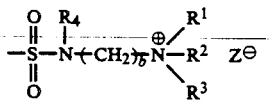

wherein each of $R^1$, $R^2$, $R^3$ is a lower alkyl group, provided $R^1$ and $R^2$ may together form a tetramethylene group or a pentamethylene group, $R^4$ is a hydrogen atom or a lower alkyl group, provided $R^3$ and $R^4$ may together form an ethylene group or a trimethylene group, $Z^\ominus$ is a halogen anion, and b is an integer of from 2 to 10.

When the electrolytic solution is an acid solution, the anion exchange membrane may be a fluorinated anion exchange membrane having a group involving any quaternary ammonium group described already.

The following groups may be mentioned as specific examples of the group involving a quaternary ammonium group:

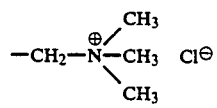

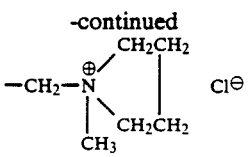

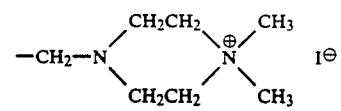

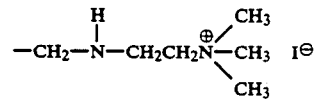

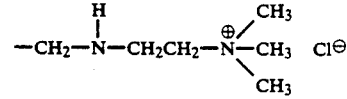

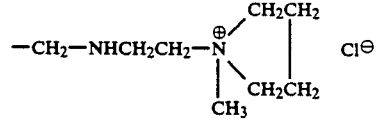

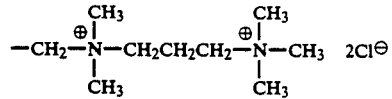

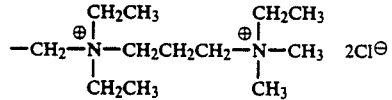

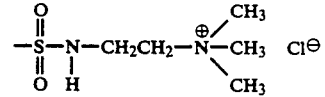

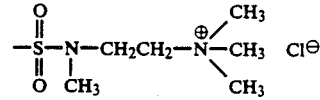

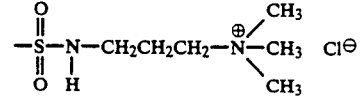

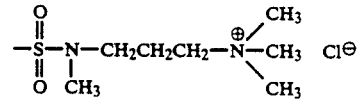

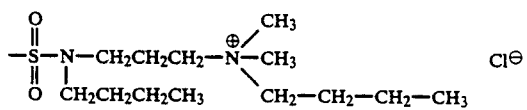

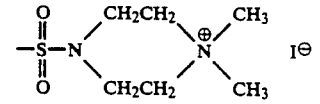

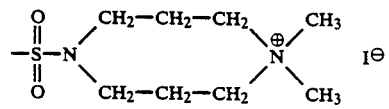

-continued

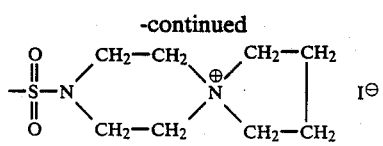

The anion exchange membranes used in the present invention usually have an ion exchange capacity of from 0.16 to 3.0 meq/g dry resin, preferably from 0.5 to 2.8 meq/g dry resin. If the ion exchange capacity is less than 0.5 meq/g dry resin, the membrane resistance tends to be high, the cell voltage tends to be high, and the cost for electric power will increase. On the other hand, if the ion exchange capacity exceeds 2.8 meq/g dry resin, there will be a problem such as the swelling or disintegration of the membrane, which tends to interfere with a constant stabilized electrolytic operation.

The thickness of the fluorinated anion exchange membrane of the present invention is usually within a range of from 40 to 500 μm, preferably from 100 to 300 μm. Further, a reinforcing material may be introduced to increase the strength of the membrane.

As mentioned above, the anion exchange membranes having a special structure show excellent durability.

An appropriate fluorinated anion exchange membrane is selected depending upon the electrolytic conditions, so that no degradation of the fluorinated anion exchange membrane is observed.

In the two compartment electrolytic cell, wherein the anion exchange membrane having a special structure as mentioned above is used as a diaphragm, the aqueous solution containing metal ions or metal complex ions is supplied to a cathode compartment, and the metal ions or metal complex ions are electrolytically reduced to electroplate a metal on the cathode. The electrolytic system of the present invention is shown in FIG. 1.

To a cathode compartment 2 of an electrolytic cell 1, an aqueous solution containing metal ions or metal complex ions is supplied, and the metal ions or metal complex ions are electrolytically reduced to electroplate a metal on a cathode 3. To an anode compartment 4, an aqueous solution containing no metal ions or metal complex ions is supplied, and oxygen or chlorine gas is generated at the anode.

In such a two compartment electrolysis by using an anion exchange membrane as the diaphragm, the electrolytic cell can be made compact by utilizing the excellent processability of the fluorinated anion exchange membrane. Namely it is possible to employ a cylindrical membrane. Further, by the combination with a fluidized bed electrode, the recovery of a metal can be conducted in good yield. It is also possible to establish a continuous electrolytic system by providing tanks for the anolyte and catholyte, respectively, and connecting the tanks to the electrolytic cell by pipes so that the withdrawal and supply of the anolyte and catholyte can be continuously conducted.

The concentration of the metal in the metal solution in the cathode compartment may be within a wide range of from about 0.1 ppm to the saturation concentration, and the concentration can suitably be selected depending upon the particular purpose. The concentration of the aqueous solution used as an electrolyte may be within a wide range of from $10^{-2}$ to 10 mols/liter. However, it is preferred to employ a low concentration to increase the efficiency for the recovery of the metal.

Likewise, the concentration of the aqueous solution to be supplied to the anode compartment may be within a wide range of from $10^{-2}$ to 10 mols/liter, but it is preferably low as in the case of the catholyte solution. The metals for recovery is by no means restricted to such specific metals, but it is preferred to recover the precious metals, for example, platinum metal group, gold or silver, which cannot be dissolved in aqueous acid or cyanide solution.

The anode and cathode to be used in the present invention may be made of conventional electrode materials. Inexpensive and corrosion resistant electrode materials having a low overvoltage, are suitably selected taking the particular electrolytic process into accounts.

As the cathode, it is preferred to employ a three dimensional electrode having a high specific surface area such as granular or fibrous carbon to increase the effective surface area as mentioned above.

As the anode, a noble metal having corrosion resistance to an aqueous solution having a pH value at any level ranging from an acid to a base, a metal such as Ti, Ta, Zr or Nb, or an electrode obtained by coating a platinum group metal such as Pt, Ir or Rh and/or an oxide of a platinum metal group on the surface of a substrate of such a metal, may be employed.

The electrolytic temperature of the diaphragm electrolytic cell in the present invention is from room temperature to about 100° C., and the electrolysis can be conducted at a current density within a range of from $10^{-2}$ to 50 A/dm$^2$. By using a three dimensional electrode having a high specific surface area as the cathode, the current density relative to the real surface area of the cathode can be reduced to a level of from 1/100 to 1/10,000 of the above-mentioned numerical value.

When the concentration of metal ions and/or metal complex ions are high, the higher the current density, the higher the efficiency. On the other hand, in the case of a low concentration, the smaller the current density, the higher the efficiency. Therefore, an appropriate current density may suitably be selected depending upon the concentration of metal ions and/or metal complex ions.

Further, we discovered the fact that the anion exchange membrane with the ion exchange capacity different from one side to the other side is effective to suppress the permeation of metal ions and/or metal complex ions through the anion exchange membrane. In such anion exchange membrane, the ratio in the ion exchange capacity between one side and the other side is usually within a range of from 1.1 to 19, preferably within a range of from 1.3 to 5.6. If the ratio in the ion exchange capacity is less than the above range, the effect for suppressing the permeation of the metal ions and/or metal complex ions tends to be inadequate, and if the ratio in the ion exchange capacity exceeds the above range, the electrical resistance of the membrane tends to increase.

The actual ion exchange capacity on the side having a large ion exchange capacity is from 0.18 to 3.0 meq/g dry resin, preferably from 0.21 to 3.0 meq/g, and the actual ion exchange capacity on the side having a small ion exchange capacity is from 0.16 to 2.7 meq/g dry resin, preferably from 0.16 to 2.3 meq/g dry resin.

The side having a small ion exchange capacity has a small water content, whereby the impregnation of metal ions or metal complex ions is little. Accordingly, it is possible to prevent leakage of metal ions or metal complex ions into the anolyte by disposing the anion exchange membrane so that the side having a small ion exchange capacity faces the cathode compartment containing the metal ions or metal complex ions.

The anion exchange membrane in which the ion exchange capacity of one side is different from the ion exchange capacity of the other side can be produced by the lamination of two anion exchange membranes having different ion exchange capacities or by the change of the ion exchange capacity with chemical treatment of the anion exchange membrane having ion exchange groups uniformly distributed.

Furthermore, we discovered the fact that the penetration of metal ion and/or metal complex ions through the anion exchange membrane can be suppressed remarkably by using the anion exchange membrane prepared by the method which will be mentioned below. Namely, the anion exchange membranes are prepared by subjecting a carboxylate membrane made of a copolymer having repeating units of the formula:

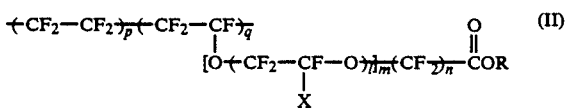

wherein X is F or $CF_3$, $l$ is an integer of from 0 to 5, m is 0 or 1, n is an integer of from 1 to 5, and p/q is from 4 to 16, and R is an alkyl group, to an acid or base treatment, and then introducing anion exchange groups thereinto.

The fluorinated anion exchange membrane to be used in this embodiment is prepared by a special process which comprises subjecting a carboxylate membrane of a copolymer having repeating units of the formula II to an acid or base treatment, and then introducing anion exchange groups thereinto.

More specifically, one side or both sides of a carboxylate membrane made of a copolymer of the formula II such as

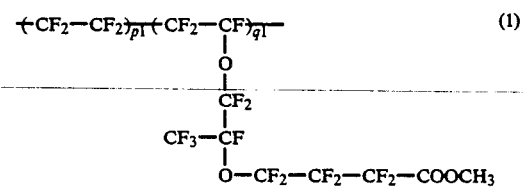

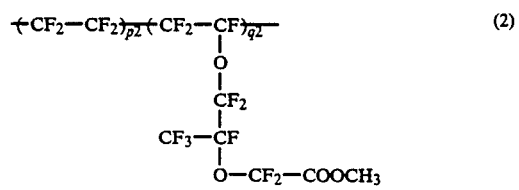

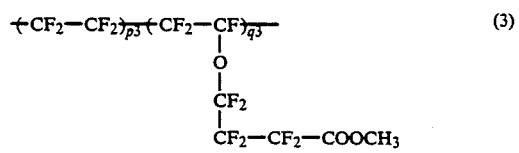

are subjected to an acid or base treatment, followed by the introduction of anion exchange groups.

As the acid or base to be employed, hydrochloric acid sulfuric acid or nitric acid, or aqueous ammonia or sodium hydroxide, may be employed. The acid or base treatment may be conducted at a temperature within a range of from 0° to 80° C.

By the acid or base treatment, the leakage of metal ions and/or metal complex ions will be substantially suppressed when the finally obtained fluorinated anion exchange membrane is used for electrolysis.

The thickness of the membrane to be treated by the acid or base is usually within a range of from 1 to 80% of the entire membrane thickness, preferably within a range of from 10 to 50% of the entire thickness. If the acid or base-treated thickness is less than the above range, the effect for suppressing the leakage of the metal ions and/or metal complex ions through the finally obtained anion exchange membrane tends to be inadequate. On the other hand, if the acid or base-treated thickness exceeds the above range, the electric resistance of the finally obtained anion exchange membrane tends to increase.

The fluorinated anion exchange membrane obtained by the special process to be used in the present invention, is obtainable by the introduction of anion exchange groups subsequent to the above-mentioned acid or base treatment.

The following three routes may be mentioned as methods for the introduction of the anion exchange groups to the membrane treated with an acid or base as mentioned above.

Route 1

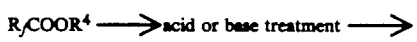

wherein:
$R^1$, $R^2$, $R^3$ = lower alkyl group,
$R^4$ = lower alkyl group,
$Z^\ominus$ = halogen anion, $BF_4^\ominus$, $SbCl_6^\ominus$,

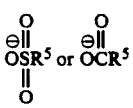

wherein $R^5$ = lower alkyl group, substituted or unsubstituted phenyl group, or lower perfluoroalkyl group.

$R_f =$

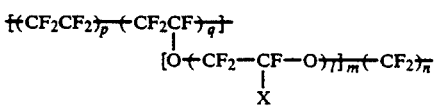

wherein X is F or $CF_3$, $l$ is an integer of from 0 to 5, m is 0 or 1, n is an integer of from 1 to 5, and p/q is from 4 to 16.

Now, Route 1 will be described.

The membrane treated with an acid or base and dried under reduced pressure, is reacted with a lower dialkylamine of the formula:

to convert it to a carboxylic acid amide membrane. As the lower dialkylamine of the formula (1), there may be mentioned dimethylamine, diethylamine, dipropylamine or methyl ethyl amine. The reaction with such an amine may be conducted by contacting a gaseous amine to the membrane, or in a liquid amine or by using a solvent. As such a solvent, an ether such as diethyl ether, tetrahydrofuran or dioxane, or a hydrocarbon such as benzene, toluene or hexane, may be employed.

The carboxylic acid amide membrane thus obtained, can be converted to an amine membrane by reacting it with a reducing agent. As the reducing agent, lithium aluminum hydride, diborane or the like may be employed. From the viewpoint of the reaction efficiency, it is preferred to employ diborane. The diborane to be used, may be generated, for example, by reacting a boron trifluoride-ether complex to sodium borohydride, or various complexes of borane, such as a dimethylsulfide complex, may be employed.

The reaction can be smoothly conducted in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The amine membrane thus obtained is reacted with an alkylating agent ($R^3Z$) for alkylation (quaternization), whereby it can be converted to a membrane having quaternary ammonium groups. As the alkylating agent, there may be employed methyl iodide, ethyl bromide, n-propyl bromide, trimethyloxonium fluoroborate (($CH_3)_3OBF_4$), triethyloxonium fluoroborate (($C_2H_5)_3OBF_4$), trimethyloxonium hexachloroantimonate (($CH_3)_3OSbCl_6$) or methyl trifluoromethanesulfonate. For this alkylation, methanol, ethanol, methylene chloride, chloroform, carbon tetrachloride or the like may be employed as the solvent.

Here, if it is necessary to exchange the counter ions of the membrane having the groups involving quaternary ammonium groups thus obtained, such an exchange of the counter ions can be conducted by the treatment with an alkali metal salt by a conventional method.

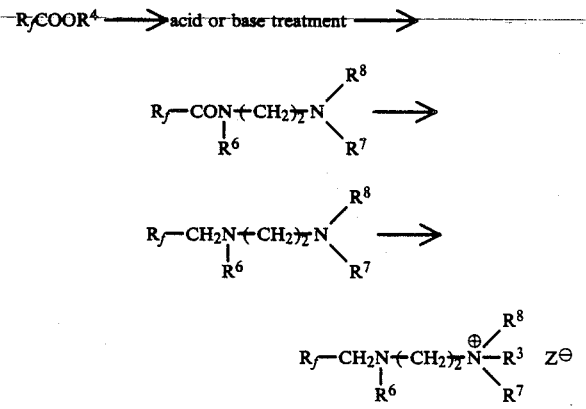

wherein $R^6$ is a hydrogen atom or a lower alkyl group, each of $R^7$, $R^8$ is a lower alkyl group, or $R^6$ and $R^7$ may together form a polymethylene group of the formula $(CH_2)_a$ wherein a is an integer of 2 or 3, and $R^3$, $Z^\ominus$ and $R_f$ are as defined above.

Now, Route 2 will be described.

The membrane treated with an acid or base, is reacted with a diamine having the formula:

to convert it to an aminocarboxylic acid amide membrane. As the diamine of the formula (2), N,N-dimethylethylenediamine, N,N,N'-trimethylethylenediamine, N-methylpiperazine or N-propylpiperazine may be mentioned. Instead of the above diamine, a corresponding silyl amine with the above formula (2) in which the hydrogen atom on the nitrogen atom is replaced by a trimethylsilyl group, may be employed.

The reaction with such a diamine, may be conducted in a liquid amine or by using a solvent. As such a solvent, an ether such as diethyl ether, tetrahydrofuran or dioxane, or a hydrocarbon such as benzene, toluene or hexane, may be employed.

The aminocarboxylic acid amide membrane thus obtained, may be converted to a diamine membrane by reacting it with a reducing agent. As such a reducing agent, lithium aluminum hydride or diborane may be employed. In view of the reaction efficiency, it is preferred to employ diborane. The diborane to be used, may be generated, for example, by reacting a boron trifluoride-ether complex to sodium borohydride, or various complexes of borane such as a dimethylsulfide complex, may be employed.

The reaction can be conducted smoothly in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The diamine membrane thus obtained may be reacted with an alkylating agent for alkylation, whereby it can be converted to a membrane having the groups involving quaternary ammonium groups. As the alkylating agent, there may be employed methyl iodide, methyl bromide, n-propyl bromide, trimethyloxonium fluoroborate (($CH_3)_3OBF_4$), triethyloxonium fluoroborate (($C_2H_5)_3OBF_4$), trimethyloxonium hexachloroantimonate (($CH_3)_3OSbCl_6$) or methyl trifluoromethane sulfonate. For this alkylation, methanol, ethanol, methylene chloride, chloroform or carbon tetrachloride may be employed as the solvent.

Here, if it is necessary to exchange the counter ions of the membrane having the groups involving quaternary ammonium groups thus obtained, such an exchange may be conducted by the treatment with an alkali metal salt by a conventional method.

Route 3

$R_fCOOR^4 \longrightarrow$ acid or base treatment $\longrightarrow$

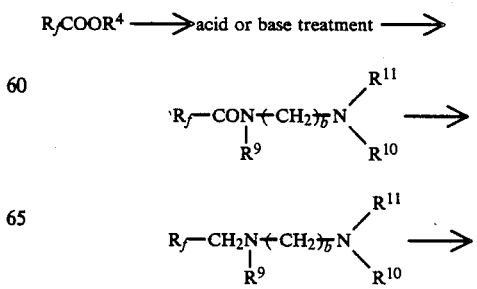

-continued
Route 3

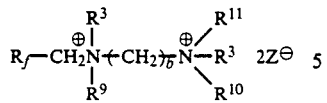

wherein $R^9$ is a hydrogen atom or a lower alkyl group, each of $R^{10}$ and $R^{11}$ is a lower alkyl group, or $R^9$ and $R^{10}$ may together form a polymethylene chain of the formula $(CH_2)_c$ wherein c is an integer of 2 or 3, b is an integer of from 3 to 7, and $R^3$, $Z^\ominus$ and $R_f$ are as defined above.

Now, Route 3 will be described.

The membrane treated with an acid or base is reacted with a diamine having the formula:

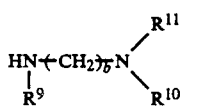  (3)

to convert it to an aminocarboxylic acid amide membrane. As the diamine of the formula (3), N,N-dimethylpropanediamine, N,N,N'-trimethylpropanediamine, N,N-dimethylbutylenediamine, N,N,N'-trimethylbutylenediamine or N,N-diethylpropanediamine may be mentioned. Instead of the above diamine, a corresponding silyl amine having the formula (3) with the hydrogen atom on the nitrogen atom replaced by a trimethylsilyl group, may be employed.

The reaction with such a diamine, may be conducted in a liquid amine or by using a solvent. As such a solvent, and ether such as diethyl ether, tetrahydrofuran or dioxane, or a hydrocarbon such as benzene, toluene or hexane, may be employed.

The aminocarboxylic acid amide membrane thus obtained may be converted to a diamine membrane by reacting it with a reducing agent. As such a reducing agent, lithium aluminum hydride or diborane may be employed. However, from the viewpoint of the reaction efficiency, it is preferred to employ diborane. The diborane to be used, may be generated, for instance, by reacting a boron trifluoride-ether complex to sodium borohydride, or various complexes of borane, such as a methyl sulfide complex, may be employed.

The reaction may be conducted smoothyl in an ether solvent such as tetrahydrofuran, dioxane or diglyme. It is preferred that during the initial stage of the reaction, the reaction system is maintained within a range of from an ice-cooled temperature to room temperature, and then heated to a temperature of from a refluxing temperature to 100° C. to complete the reaction.

The diamine membrane thus obtained may be reacted with an alkylating agent for alkylation, whereby it can be converted to a membrane having the groups involving quaternary ammonium groups. As such an alkylating agent, there may be mentioned methyl iodide, methyl bromide, n-propyl bromide, trimethyloxonium fluoroborate $((CH_3)_3OBF_4)$, triethyloxonium fluoroborate $((C_2H_5)_3OBF_4)$, trimethyloxonium hexachloroantimonate $((CH_3)_3OSbCl_6)$ or methyl trifluoromethanesulfonate. For this alkylation, methanol, ethanol, methylene chloride, chloroform or carbon tetrachloride may be employed as the solvent.

Here, if it is necessary to exchange the counter ions of the membrane having the groups involving quaternary ammonium groups thus obtained, such an exchange can be conducted by the treatment with an alkali metal salt by a conventional method.

The anion exchange membranes thus prepared may have the following structures as the specific examples:

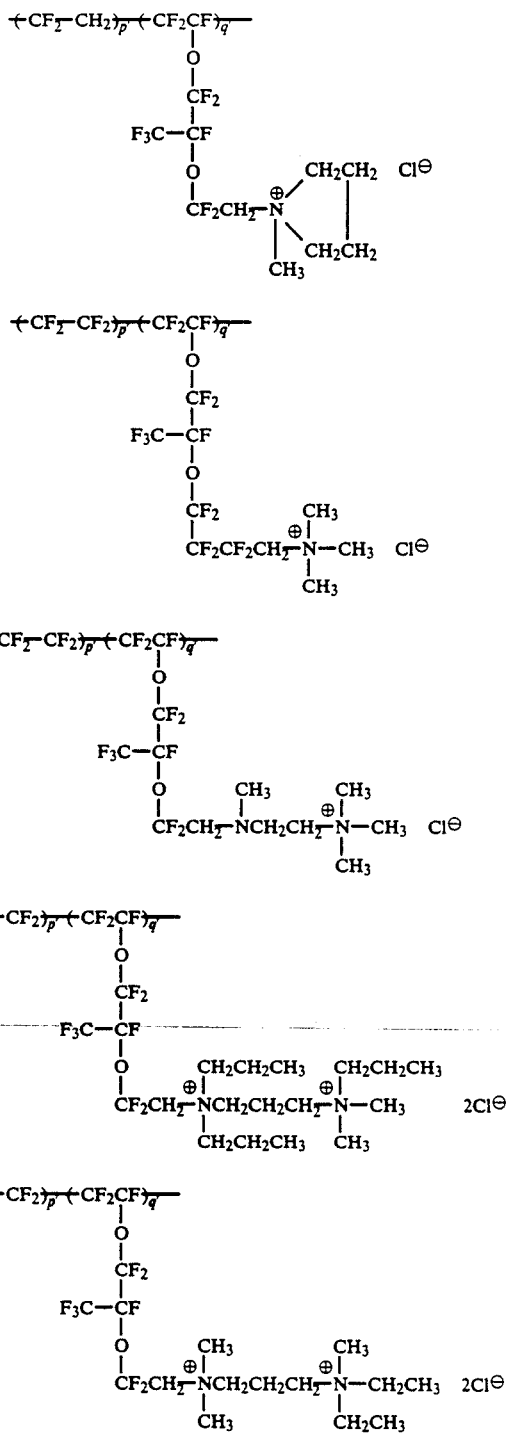

Furthermore, one of the examples for appropriate selection of an anion exchange membrane in accordance with the kind of electrolytic solution will be mentioned. Namely, when the electrolytic solution is cyanide aqueous, the fluorinated anion exchange membrane preferably has, as the group involving a quaternary ammonium group, a group of the formula:

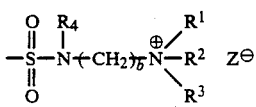

wherein each of R$^1$, R$^2$, R$^3$ is a lower alkyl group, provided R$^1$ and R$^2$ may together form a tetramethylene group or a pentamethylene group, R$^4$ is a hydrogen atom or a lower alkyl group, provided R$^3$ and R$^4$ may together form an ethylene group or a trimethylene group, Z$^\ominus$ is a halogen anion, and b is an integer of from 2 to 10.

This anion exchange membrane shows remarkable durability against the cyanide solution so that it is possible to produce a metal efficiently in the cathode compartment, and to decompose a cyanide anion transferring through the anion exchange membrane in the anode compartment under a stabilized condition for a long period of time in a two compartment electrolytic cell, wherein this anion exchange membrane is used.

Now, the present invention will be described in further detail with reference to Examples. However, it should be understood that the present invention is by no means restricted to such specific Examples.

EXAMPLE 1

Electrolysis was conducted by supplying an aqueous acid solution containing chloroplatinic acid to the cathode compartment 2 of the diaphragm electrolytic cell 1 as shown in FIG. 1 and an aqueous acid solution to the anode compartment 4.

The electrolytic conditions are shown in Table 1.

TABLE 1

| Electrolytic conditions | |
|---|---|
| Catholyte composition | 5% Aqua regia aqueous solution containing chloroplatinic acid |
| Anolyte composition: | 5% Aqua regia aqueous solution |
| Amount of the electrolyte in each compartment: | 100 ml |
| Electrode: | |
| Cathode | Graphite electrode |
| Anode: | Titanium-supported noble metal electrode |
| Electrode surface area: | 32 cm$^2$ |
| Amount of electricity: | 1.2 time the theoretical electricity |

Figure 2:
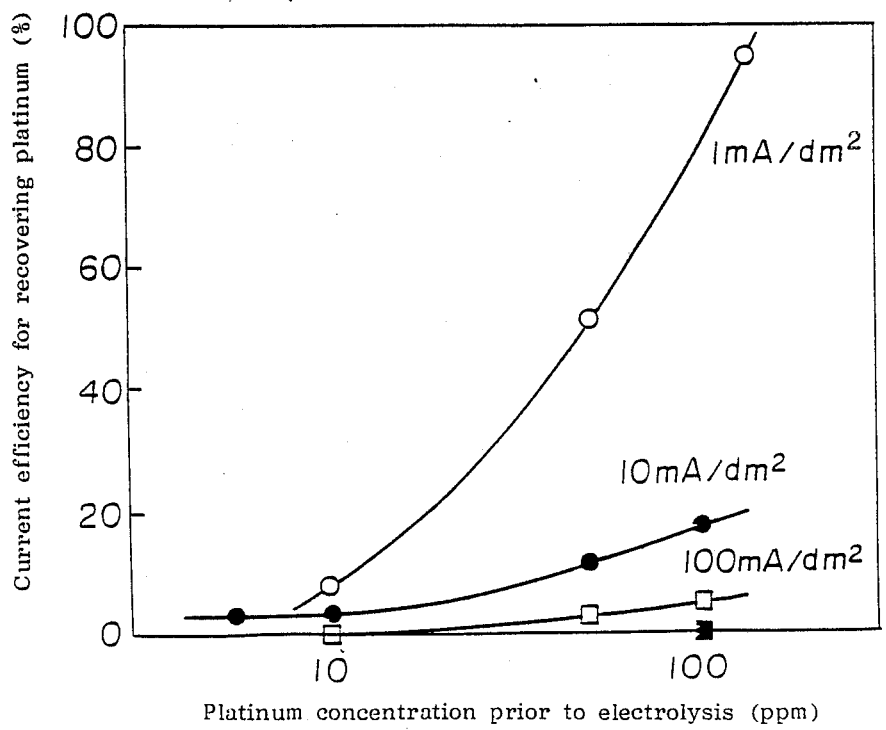
FIG. 2 is a graph showing the relationship between the current density and the current efficiency for the recovery of platinum.

FIG. 2 shows the change in the efficiency for the electroplating of platinum due to the current density. When the current density was 1 mA/dm$^2$, the electroplating efficiency was high. Therefore, in the subsequent operation, the current density was adjusted to 1 mA/dm$^2$.

As the anion exchange membrane, a fluorinated anion exchange membrane shown by the following formula was employed:

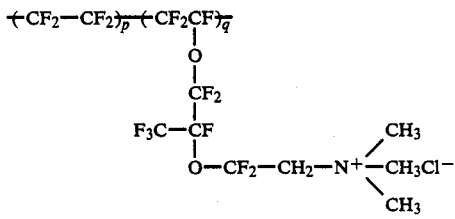

The characteristic values of this anion exchange membrane are shown in Table 2.

TABLE 2

| Characteristic values | |
|---|---|
| Ion exchange capacity: | 1.43 meq/g dry resin |
| Electric resistance: | 2.8 ωcm$^2$ |
| Anion selectivity: | >0.96 |
| Thickness: | 320 μm |

Platinum was recovered from the 5% aqua regia solution having a platinum concentration of 100 ppm under the electrolytic conditions as shown in Table 1, and the platinum recovery rate, etc. were as shown in Table 3.

TABLE 3

| Results of measurements | |
|---|---|
| Platinum recovery rate: | 90% |
| Current efficiency: | 75% |
| Leaking rate of platinum: | 3.8% |

EXAMPLE 2 AND COMPARATIVE EXAMPLES 1 AND 2

The durabilities of various anion exchange membranes in an aqueous potassium cyanide solution were measured by the changes in the membrane resistance after immersing them in potassium cyanide.

The immersing conditions are shown in Table 4.

TABLE 4

| | |
|---|---|
| KCN concentration: | 5 mols/liter |
| Temperature: | 60° C. |
| Immersing period: | 7 days |

The structural formulas as the fluorinated anion exchange membranes are shown below. With respect to each membrane, the thickness was 230 μm, and the ion exchange capacity was 0.91 meq/g dry resin.

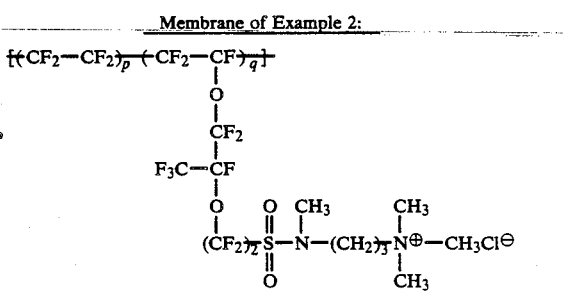

Membrane of Example 2:

Membrane of Comparative Example 1

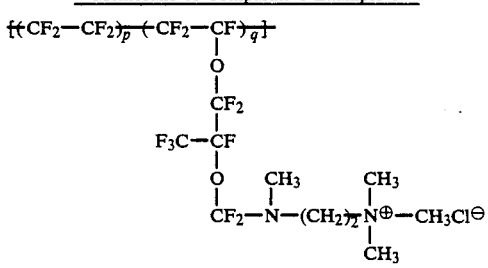

Membrane of Comparative Example 2

-continued

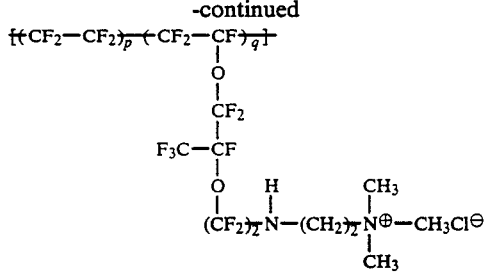

In each formula, p and q are positive numbers, and the ratio of p/q is from 2 to 16.

As a hydrocarbon anion exchange membrane, a commercially available membrane was used.

The results of measurements are shown in Table 5.

TABLE 5

| Anion exchange membranes | Membrane resistance ($\omega \times$ cm$^2$) | |
|---|---|---|
| | Before immersing | After immersing |
| Fluorinated exchange membrane (Example 2) | 7.5 | 8.0 |
| Fluorinated anion exchange membrane (Comparative Example 1) | 6.5 | $10^3$ or higher |
| Fluorinated anion exchange membrane (Comparative Example 2) | 4.8 | $10^3$ or higher |
| Hydrocarbon anion exchange membrane | 1.6 | $10^3$ or higher |

The fluorinated anion exchange membrane used in the present invention (Example 2) exhibited excellent durability. In the subsequent Examples, this membrane was employed.

Electrolysis was conducted by supplying 100 ml of an aqueous potassium hydroxide solution having a concentration of 50 g/liter containing 150 ppm of gold potassium cyanide (a gold concentration is about 100 ppm) and 1,000 ppm of potassium cyanide to the cathode compartment, and 100 ml of an aqueous potassium hydroxide solution having a concentration of 50 g/liter to the anode compartment.

The electrolytic conditions are shown in Table 6.

TABLE 6

| Electrolytic conditions | |
|---|---|
| Current: | 0.64 A |
| Electrodes: | |
| Cathode: | Platinum electrode (surface area = 10 cm$^2$) |
| Anode: | Graphite (surface area = 32 cm$^2$) |
| Amount of electricity: | 6912 Coulomb |
| Membrane surface area: | 50 cm$^2$ |

The results of measurements are shown in Table 7.

TABLE 7

| Results of measurements | |
|---|---|
| Amount of electroplated gold: | 9.48 mg |
| Recovery rate: | 94.8% |
| Amount of leaked gold: | 0.52 mg |
| Leaking rate of gold: | 5.2% |
| Remaining concentration of CN$^-$: | 10 ppm |
| Decomposition rate of CN$^-$: | 90% |

EXAMPLE 3

By using an anion exchange membrane having the same structural formula as the fluorinated anion exchange membrane used in Example 2 and having different ion exchange capacities as between one side and the other side, electrolysis was conducted in the same manner as in Example 2 by disposing the membrane so that the side having a small ion exchange capacity faced the cathode.

The physical properties of the fluorinated anion exchange membrane used are shown in Table 8.

TABLE 8

| Physical properties | |
|---|---|
| Ion exchange capacity and thickness: | one side of 0.91 meq/g dry resin in a thickness of 400 $\mu$m, the other side of 0.67 meq/g dry resin in a thickness of 40 $\mu$m. |
| Electric resistance: | 5.9 $\omega$cm$^2$ |
| Anion selectivity: | >0.97 |

The results of measurements are shown in Table 9.

TABLE 9

| Results of measurements | |
|---|---|
| Amount of electroplated gold: | 9.90 mg |
| Recovery rate: | 99.0% |
| Amount of leaked gold: | 0.10 mg |
| Leaking rate of gold: | 1.0% |
| Concentration of remaining CN$^-$: | 8 ppm |
| Decomposition rate of CN$^-$: | 92% |

As compared with Example 2, the leakage of gold is substantially suppressed by using a membrane having different ion exchange capacities as between one side and the other side.

EXAMPLE 4

Platinum was recovered under the same electrolytic conditions as in Example 1.

As the anion exchange membrane, a fluorinated anion exchange membrane obtained by the following process, was employed.

Firstly, one side of a carboxylate membrane having the following structural formula:

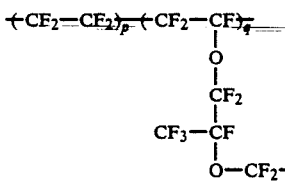
$$\text{O}-\text{CF}_2-\text{CF}_2-\text{CF}_2-\text{COOCH}_3$$

was treated with 14% aqueous ammonia at 20° C. for 1 hour, followed by vacuum drying at 60° C.

Then, the membrane thus obtained was immersed in dry tetrahydrofuran under a nitrogen atmosphere, and while supplying dimethylamine gas under cooling with ice, reacted under cooling for 12 hours and at 25° C. for 36 hours.

Then, the membrane was vacuum-dried at 60° C. to obtain a carboxylic acid amide membrane.

Then, sodium borohydride was added to dry tetrahydrofuran under a nitrogen atmosphere, and the membrane obtained as above, was immersed therein. A boron trifluoride-ether complex was dropwise added thereto. The membrane was reacted at a refluxing temperature for 20 hours and converted to an amine membrane.

The membrane thus obtained was washed with tetrahydrofuran and methanol, and then immersed in a methanol solution of methyl iodide, and reacted at 60° C. for 96 hours.

Then, this membrane was immersed in a mixture of hydrochloric acid/methanol=½ to obtain a desired fluorinated anion exchange membrane having quaternary ammonium chloride groups.

The structure of the fluorinated anion exchange membrane thus obtained is shown by the following formula:

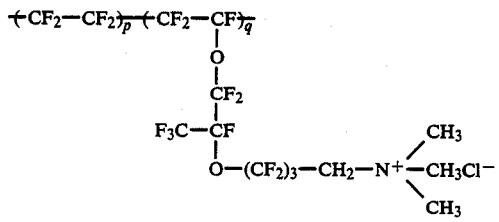

This structural formula is the same as that of the fluorinated anion exchange membrane in Example 1. However, the ion exchange capacity on the side treated with aqueous ammonia of this anion exchange membrane was as small as 0.7 meq/g resin. Other characteristic values such as the electric resistance, anion selectivity, and thickness were almost the same as in Example 1.

In the same manner as above, a fluorinated anion exchange membrane having the same structural formula and ion exchange capacity as the fluorinated anion exchange membrane treated with aqueous ammonia was prepared by treating one side of the carboxylate membrane with 4N hydrochloric acid at 40° C. for 70 hours instead of the treatment with 14% aqueous ammonia at 20° C.

Electrolysis was conducted in the same manner as in Example 1 by disposing the membrane so that the side treated with aqueous ammonia or with hydrochloric acid and having a small ion exchange capacity faced the cathode, whereby the leaking rate of platinum, etc. were measured. The results are shown in Table 10.

TABLE 10

| Results of measurements | | |
|---|---|---|
| | Ammonia treatment | Hydrochloric acid treatment |
| Recovery rate of platinum | 95.0% | 94.1% |
| Current efficiency | 79.2% | 78.4% |
| Leaking rate of platinum | 0.7% | 0.9% |

As compared with Example 1, the leaking rate of platinum is small.

We claim:

1. A method for recovering a metal by electrolysis in an electrolytic cell comprising an anode compartment and a cathode compartment partitioned by a diaphragm by supplying to the cathode compartment an aqueous solution of a water-soluble metal compound, and electrolytically reducing metal ions or metal complex ions to electroplate the metal on a cathode, said diaphragm being a fluorinated anion exchange membrane made of a copolymer having repeating units of the formula:

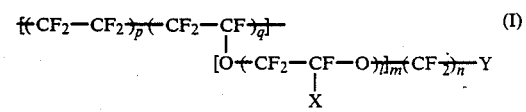

wherein X is F or CF$_3$, l is an integer of from 0 to 5, m is 0 or 1, n is an integer of 1 to 5, each p and q is a positive number and the ratio of p/q is from 4 to 16, and Y is a group containing a quaternary ammonium anion exchange group where the fluorinated anion exchange membrane is prepared by subjecting a carboxylate membrane made of a copolymer having repeating units of the formula:

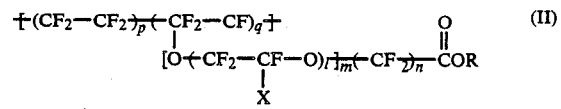

wherein X, l, p, q, m and n are as defined above, to an acid or base treatment, and then introducing said anion exchange groups thereinto.

2. The method according to claim 1, wherein the ion exchange capacities of the anion exchange membrane vary from one phase to the other phase between 0.16 meq/g. dry resin and 3.0 meq/g dry resin.

3. A method for recovering a metal by electrolysis in an electrolytic cell comprising an anode compartment and a cathode compartment partitioned by a diaphragm by supplying to the cathode compartment an aqueous solution of a water-soluble metal compound, and electrolytically reducing metal ions or metal complex ions to electroplate the metal on a cathode, said diaphragm being a fluorinated anion exchange membrane made of a copolymer having repeating units of the formula:

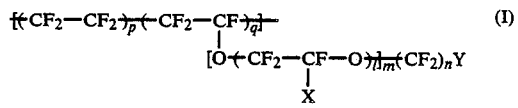

wherein X is F or CF$_3$, l is an integer of from 0 to 5, m is 0 or 1, n is an integer of 1 to 5, each of p and q is a positive number and the ratio of p/q is from 2 to 16, and Y is a group containing a quaternary ammonium group; and wherein the ion exchange capacities of the anion exchange membrane vary from one side to the other side between 0.15 meq/g dry resin and 3.0 meq/g dry resin, said variation of capacity being produced by lamination of two anion exchange membranes having different ion exchange capacities.

4. The method of claim 3, wherein the anion exchange membrane is disposed in the electrolytic cell with the side having the smaller ion exchange capacity facing the cathode compartment.

5. A method for recovering a metal by electrolysis in an electrolytic cell comprising an anode compartment and a cathode compartment partitioned by a diaphragm by supplying to the cathode compartment an aqueous solution of a water-soluble metal compound, and electrolytically reducing metal ions or metal complex ions to electroplate the metal on a cathode, said diaphragm being a fluorinated anion exchange membrane made of a copolymer having repeating units of the formula:

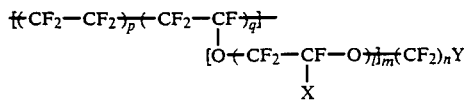 (I)

wherein X is F or CF₃, l is an integer of from 0 to 5, m is 0 or 1, n is an integer of 1 to 5, each of p and q is a positive number and the ratio of p/q is from 2 to 16, and Y is a group containing a quaternary ammonium group; and wherein the ion exchange capacities of the anion exchange membrane vary from one side to the other side between 0.15 meq/g dry resin and 3.0 meq/g dry resin, said variation of capacity being produced by change of ion exchange capacity with chemical treatment of one side of said anion exchange membrane.

6. The method according to claim 1 or 5, wherein the group containing a quaternary ammonium group has the formula:

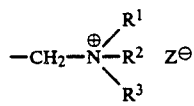

wherein each of R¹, R² and R³ is a lower alkyl group, provided that R¹ and R² may together form a tetramethylene group or a pentamethylene group, and Z⊖ is a halogen anion.

7. The method according to claims 1, 3 or 5, wherein the group containing a quaternary ammonium group has the formula:

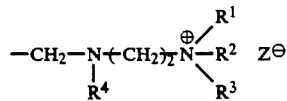

wherein each of R¹, R² and R³ is a lower alkyl group, provided R¹ and R² may together form a tetramethylene group or a pentamethylene group, R⁴ is a hydrogen atom or a lower alkyl group, and Z⊖ is a halogen anion.

8. The method according to claims 1, 3 or 5, wherein the group containing a quaternary ammonium group has the formula:

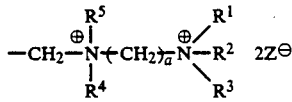

wherein each of R¹, R² and R³ is a lower alkyl group, provided R¹ and R² may together form a tetramethylene group or a pentamethylene group, each of R⁴ and R⁵ is a hydrogen atom or a lower alkyl group, Z⊖ is halogen anion, and a is an integer of from 3 to 7.

9. The method according to claims 1, 3 or 5, wherein the group containing a quaternary ammonium group has the formula:

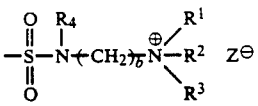

wherein each of R¹, R², R³ is a lower alkyl group, provided R¹ and R² may together form a tetramethylene group or a pentamethylene group, R⁴ is a hydrogen atom or a lower alkyl group, provided R³ and R⁴ may together form an ethylene group or a trimethylene group, Z⊖ is a halogen anion, and b is an integer of from 2 to 10.

10. The method according to claim 5, wherein the anion exchange membrane is a fluorinated anion exchange membrane prepared by subjecting a carboxylate membrane made of a copolymer having repeating units of the formula:

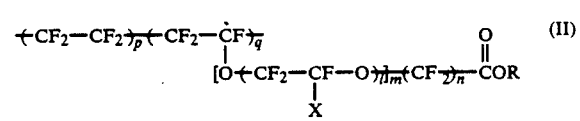 (II)

wherein X is F or CF₃, l is an integer of from 0 to 5, m is 0 or 1, n is an integer of from 1 to 5, and p/q is from 4 to 16, and R is an alkyl group, to an acid or base treatment, and then introducing anion exchange groups thereinto.

11. The method according to claims 1, 3, or 5, wherein the solution is an aqueous solution of a cyanide, and the group involving a quaternary ammonium group has the formula:

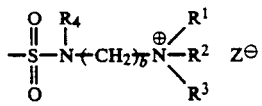

wherein each of R¹, R², R³ is a lower alkyl group, provided R¹ and R² may together form a tetramethylene group or a pentamethylene group, R⁴ is a hydrogen atom or a lower alkyl group, provided R³ and R⁴ may together form an ethylene group or a trimethylene group, Z⊖ is a halogen anion, and b is an integer of from 2 to 10.

12. The method of claim 5, wherein the anion exchange membrane is disposed in the electrolytic cell with the side having the smaller ion exchange capacity facing the cathode compartment.

* * * * *